United States Patent [19]

Miyamori

[11] Patent Number: 5,133,056
[45] Date of Patent: Jul. 21, 1992

[54] INTERRUPT CONTROLLER

[75] Inventor: Takashi Miyamori, Tokyo, Japan

[73] Assignee: Kabushiki Kaisha Toshiba, Kawasaki, Japan

[21] Appl. No.: 402,754

[22] Filed: Sep. 5, 1989

[30] Foreign Application Priority Data

Sep. 5, 1988 [JP] Japan .................. 63-220540

[51] Int. Cl.$^5$ ........................... G06F 9/46
[52] U.S. Cl. ................. 395/275; 364/241.2; 364/241.4; 364/247; 395/725
[58] Field of Search .......... 364/200, 900; 395/275, 395/725

[56] References Cited

U.S. PATENT DOCUMENTS

| | | | |
|---|---|---|---|
| 3,984,820 | 10/1976 | Stanley et al. | 364/200 |
| 4,023,143 | 5/1977 | Braunstein | 340/172.5 |
| 4,027,290 | 5/1977 | Subrizi et al. | 340/172.5 |
| 4,056,847 | 11/1977 | Marcantonio | 364/200 |
| 4,103,327 | 7/1978 | Dimmick | 364/200 |
| 4,302,808 | 11/1981 | Zanchi et al. | 364/200 |
| 4,352,157 | 9/1982 | Namimoto et al. | 364/200 |
| 4,470,111 | 9/1984 | Jenkins et al. | 364/200 |
| 4,644,467 | 2/1987 | McCarthy | 364/200 |
| 4,669,057 | 5/1987 | Clark, Jr. et al. | 364/900 |
| 4,701,845 | 10/1987 | Andreasen et al. | 364/200 |
| 4,761,732 | 8/1988 | Eldumiati et al. | 364/200 |
| 4,987,535 | 1/1991 | Takayama | 364/200 |
| 5,003,462 | 5/1991 | Blaner et al. | 364/200 |

OTHER PUBLICATIONS

TX Series Data Book, "Interrupt Controller & Timer", Jul., 1988 pp. 19-21.

Primary Examiner—Michael R. Fleming
Assistant Examiner—Ayaz R. Sheikh
Attorney, Agent, or Firm—Foley & Lardner

[57] ABSTRACT

The interrupt controller comprises interrupt level registers storing interrupt levels corresponding to the interrupt request signals, respectively, and a priority decision circuit for receiving outputs of the interrupt level registers and selectively outputting the interrupt level signal corresponding to the interrupt request of highest priority.

2 Claims, 6 Drawing Sheets

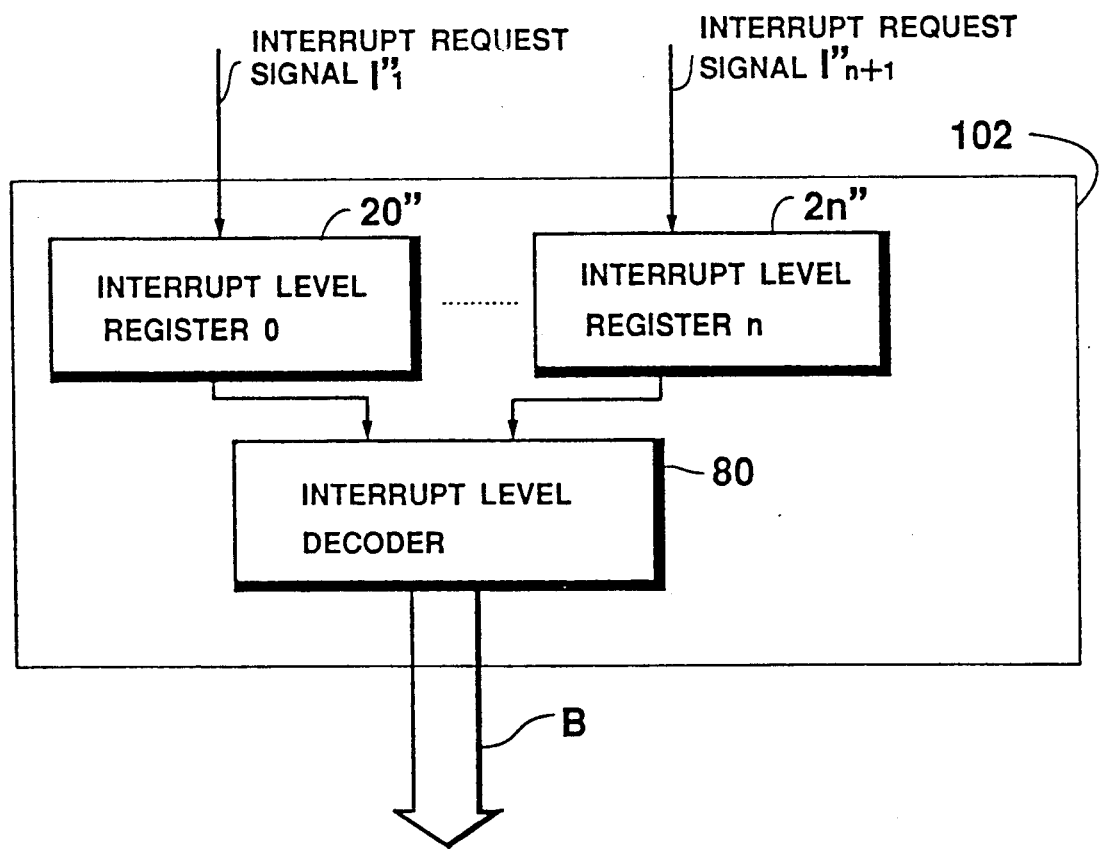

INTERRUPT CONTROLLER

BACKGROUND OF THE INVENTION

1. Field of the Invention

The present invention relates to an interrupt controller that lets a microprocessor flexibly process various interrupt requests in the descending order of priorities of the interrupt requests.

2. Description of the Prior Art

A microprocessor with an interrupt function generally executes external and internal interrupt requests in the predetermined order of priorities of the interrupt requests.

FIG. 1 shows an interrupt controlling system according to a prior art. An interrupt controller 71 outputs an interrupt level signal I to a microprocessor 72 to request the microprocessor to process the interrupt request. If a priority of the interrupt level signal I is lower than an acceptable priority set in an internal register (not shown) of the microprocessor 72, the microprocessor 72 does not process data related to the interrupt level signal I but puts the interrupt request in queue.

In this way, once an interrupt level signal corresponding to an interrupt request is outputted from the conventional interrupt controlling system to a microprocessor, this interrupt level signal is queued until the corresponding interrupt request is accepted by the microprocessor. Therefore, if another interrupt request that has a higher priority than that of the queued interrupt request occurs, the latter interrupt request of higher priority cannot be outputted to the microprocessor.

Namely, even if the latter interrupt request is accepted by the microprocessor, this interrupt request is forcibly queued because the previously occurred interrupt request has not been accepted by the microprocessor due to its low priority and queued.

SUMMARY OF THE INVENTION

To solve such a problem, an object of the present invention is to provide an interrupt controller that lets a microprocessor flexibly execute interrupt requests in the descending order of their priorities in real time.

According to the prior art, an interrupt request whose priority is lower than a predetermined priority is not accepted by a microprocessor. In such a case, a microprocessor of the present invention outputs an interrupt pending signal. Receiving the interrupt pending signal, an interrupt controller of the invention temporarily nullifies the interrupt level signal that has been outputted to the microprocessor but not accepted by the microprocessor. Then, the interrupt controller of the invention outputs an interrupt level signal corresponding to an interrupt request of current highest priority.

Namely, an interrupt request of high priority occurring during a period in which the microprocessor does not accept interrupts will not be put in a queue but instead will be flexibly executed by the microprocessor in real time.

These and other objects, features and advantages of the present invention will be more apparent from the following description of a preferred embodiment, taken in conjunction with the accompanying drawings.

BRIEF DESCRIPTION OF THE DRAWINGS

FIG. 7 is a schematic view showing slave interrupt controllers shown in FIG. 5.

DETAILED DESCRIPTION OF THE PREFERRED EMBODIMENTS

Figure 1:
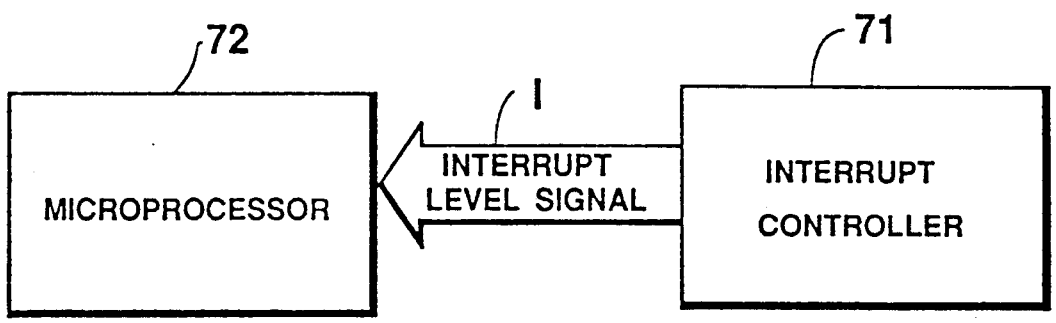
FIG. 1 is a schematic view showing an interrupt controlling system according to a prior art.
Figure 2:
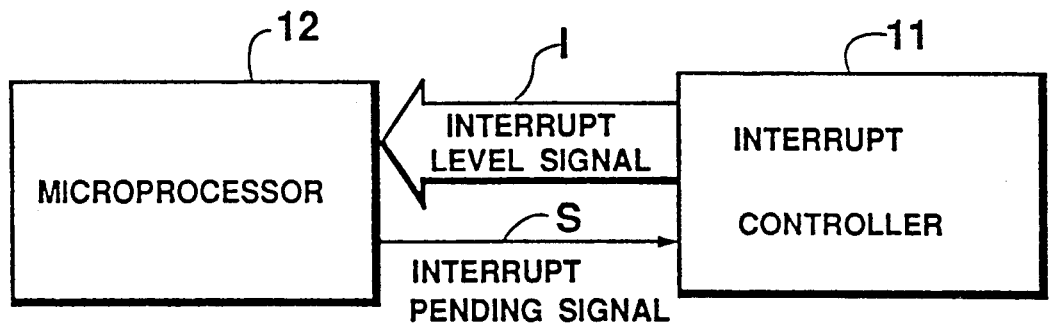
FIG. 2 is a view showing the principle of an interrupt controller according to the present invention.

FIG. 2 is a view showing the basic principle of an interrupt controller according to the present invention.

In the figure, an interrupt controller 11 generates an interrupt level signal I. If the interrupt level signal I is not accepted by the microprocessor 12, the microprocessor 12 provides the interrupt controller 11 with an interrupt pending signal S to request the interrupt controller 11 to temporarily hold the interrupt request.

Figure 3:
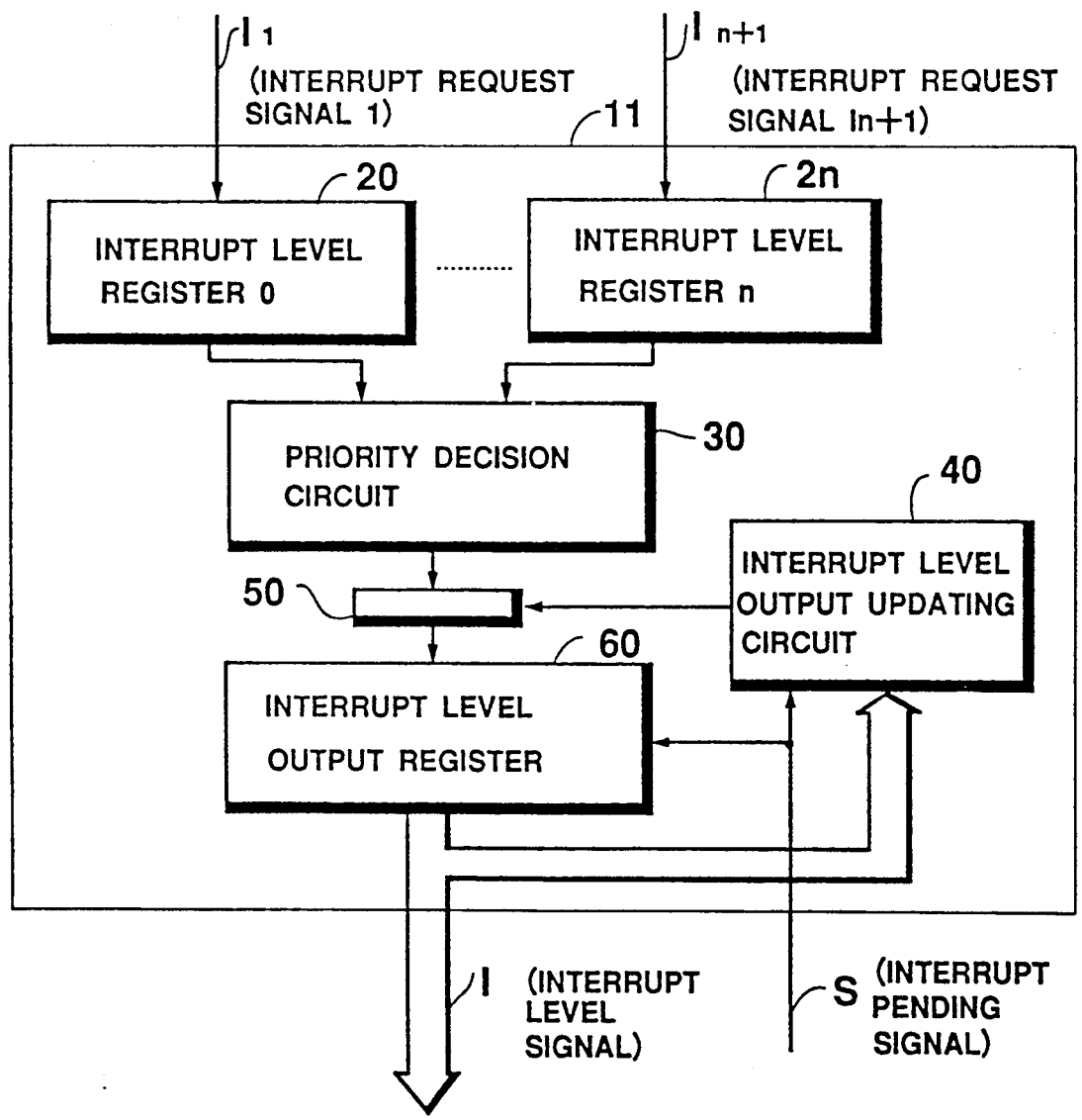
FIG. 3 is a view showing an interrupt controller according to a first embodiment of the invention.

FIG. 3 shows the details of the interrupt controller 11 of FIG. 2.

The interrupt controller 11 comprises interrupt level registers $2_O$ to $2_n$ for holding present interrupt levels corresponding to interrupt request signals $I_I$ to $I_{n+I}$, respectively; a priority decision circuit 30; an interrupt level output updating circuit 40; a gate circuit 50; and an interrupt level output register 60.

The interrupt level registers $2_O$ to $2_n$ are activated by the interrupt request signals $I_I$ to $I_{n+I}$ to output interrupt levels held in the registers to the priority decision circuit 30.

The priority decision circuit 30 decides the level of highest priority among the interrupt levels outputted from the interrupt level registers $2_O$ to $2_n$ and holds the level of highest priority. If no interrupt request is present, the priority decision circuit 30 holds a null value as an interrupt level.

When no interrupt pending signal S is outputted from the microprocessor 12 and when no valid interrupt level is set in the interrupt output register 60, the interrupt level output updating circuit 40 outputs a control signal to the gate 50 such that the contents of the priority decision circuit 30 are set in the interrupt level output register 60 through the gate 50.

The interrupt output register 60 is designed such that present contents held in the register 60 are nullified when the microprocessor 12 (FIG. 2) outputs the interrupt pending signal S.

Figure 4:
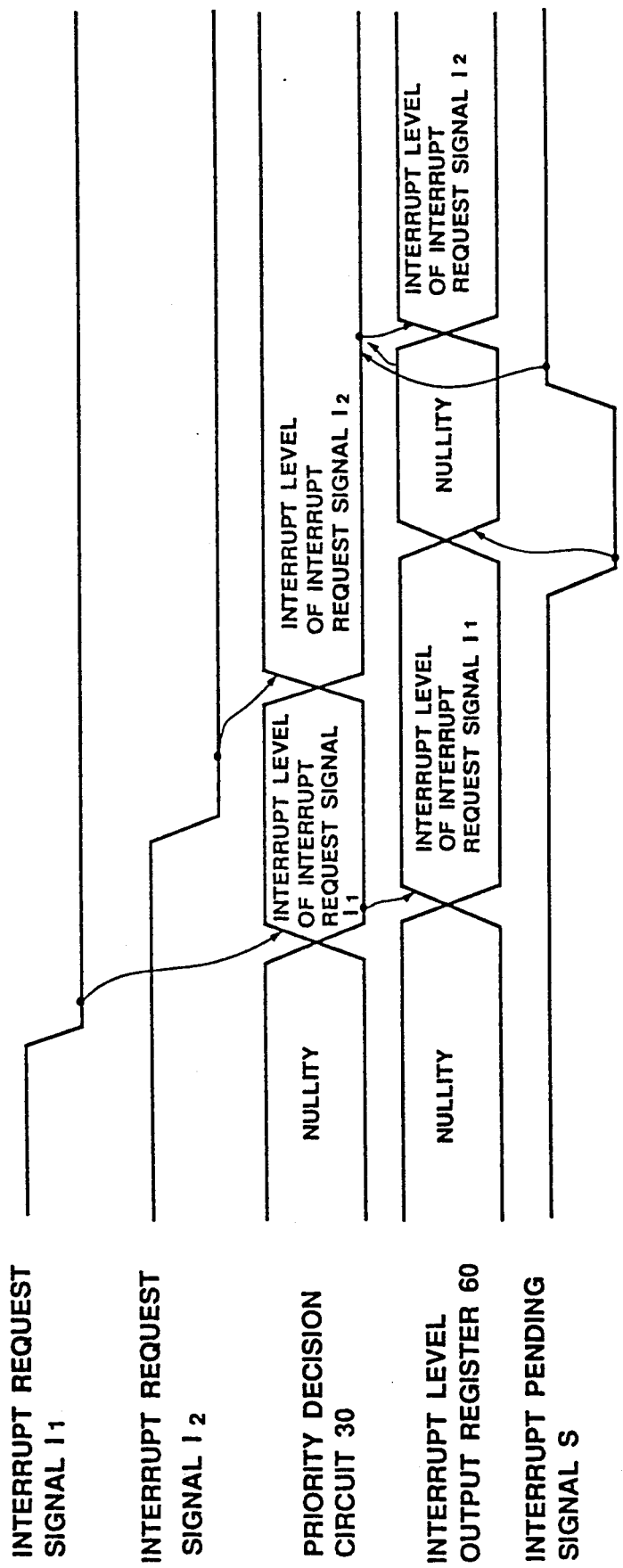
FIG. 4 is a timing chart for explaining operations of the controller of FIG. 3.

Operations of the interrupt controller 11 of FIG. 3 will be explained with reference to a timing chart shown in FIG. 4.

If an interrupt request signal $I_I$ is supplied to the interrupt level register $2_O$, the contents of the interrupt level register $2_O$ are outputted to the priority decision circuit 30. If there are no other interrupt requests, the priority decision circuit 30 decides that the interrupt level of the interrupt level register $2_O$ is the highest priority. Then, an interrupt level signal corresponding to the interrupt request of the register $2_O$ is transmitted to the microprocessor 12 through the interrupt level output register 60.

Assume the interrupt level output register 60 is holding the interrupt level of the interrupt level register $2_O$. If another interrupt request signal $I_2$ for example, is supplied to the interrupt level register $2_1$, with a higher priority than the priority of the interrupt level in register $2_2$, the priority decision circuit 30 outputs the contents of the interrupt level register $2_1$ as the interrupt level signal. However, the interrupt level output updating circuit 40 does not update the contents of the output register 60, and, therefore, the output register 60 holds the contents of the interrupt level register $2_O$ and outputs them to the microprocessor 12.

If the interrupt level of the interrupt request signal $I_l$ is not accepted by the microprocessor 12, the microprocessor 12 does not process the interrupt request. At the same time, the microprocessor 12 sends the interrupt pending signal S to the interrupt controller 11. In the interrupt controller 11, the interrupt pending signal S is given to the interrupt level output updating circuit 40. Then, the circuit 40 provides a control signal to the gate 50 such that the interrupt level signal corresponding to the interrupt request $I_2$ and outputted from the priority decision circuit 30 is transferred to the interrupt level output register 60 via the gate 50.

Therefore, the interrupt level signal corresponding to the interrupt request signal $I_2$ which has the highest present priority is transferred to the microprocessor 12 from the output register 60. Then, the microprocessor 12 executes the interrupt request.

As described above, if an interrupt level signal sent by the interrupt level output register 60 has a priority that is lower than an acceptable priority of the microprocessor 12 and is thus rejected by the microprocessor 12, and, during this period, if the priority decision circuit 30 in the interrupt controller 11 decides that a priority of a second interrupt request is higher than the preceding interrupt request, the interrupt level signal given to the microprocessor and rejected by the microprocessor is nullified. Then the second interrupt level signal following interrupt request is output to the microprocessor 12.

Figure 5:
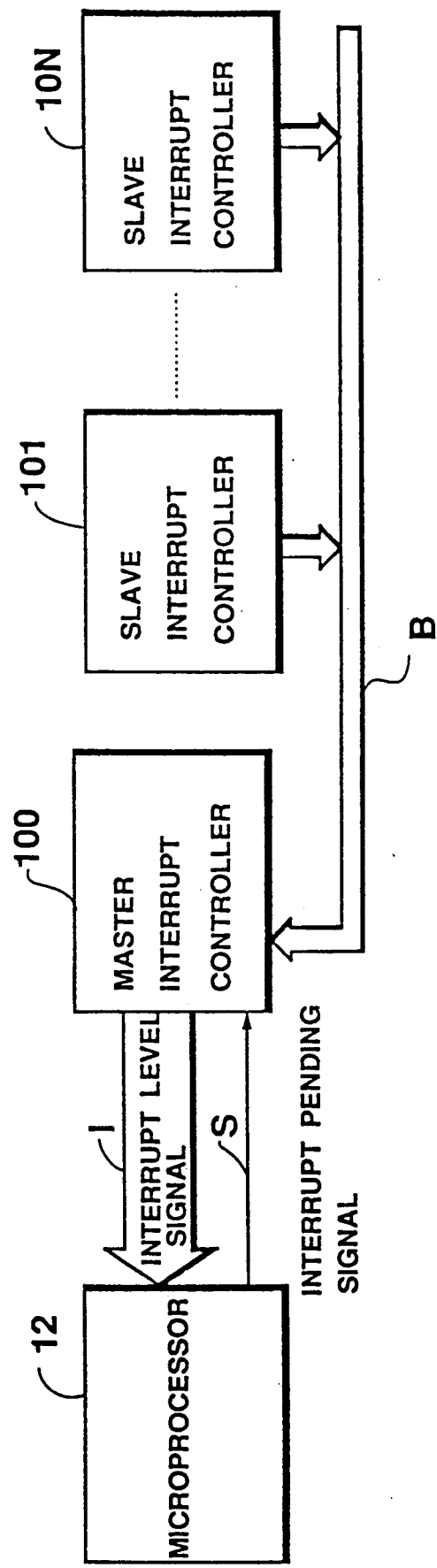
FIG. 5 is a view showing an interrupt controller according to a second embodiment of the invention.

FIG. 5 is a view showing an extended interrupt controller according to another embodiment of the invention. In this embodiment, an interrupt controller comprises a master interrupt controller $10_0$ and slave interrupt controllers $10_1$ to $10_N$. The master interrupt controller $10_0$ outputs an interrupt level signal to the microprocessor 12. The slave interrupt controllers $10_1$ to $10_N$ output bus interrupt request signals to the master interrupt controller $10_0$ via a bus B.

Therefore, an interrupt request outputted from any one of the slave interrupt controllers $10_1$ to $10_N$ is outputted to the master interrupt controller $10_0$. Then the master interrupt controller $10_0$ outputs the interrupt request to the microprocessor 12.

Figure 6:
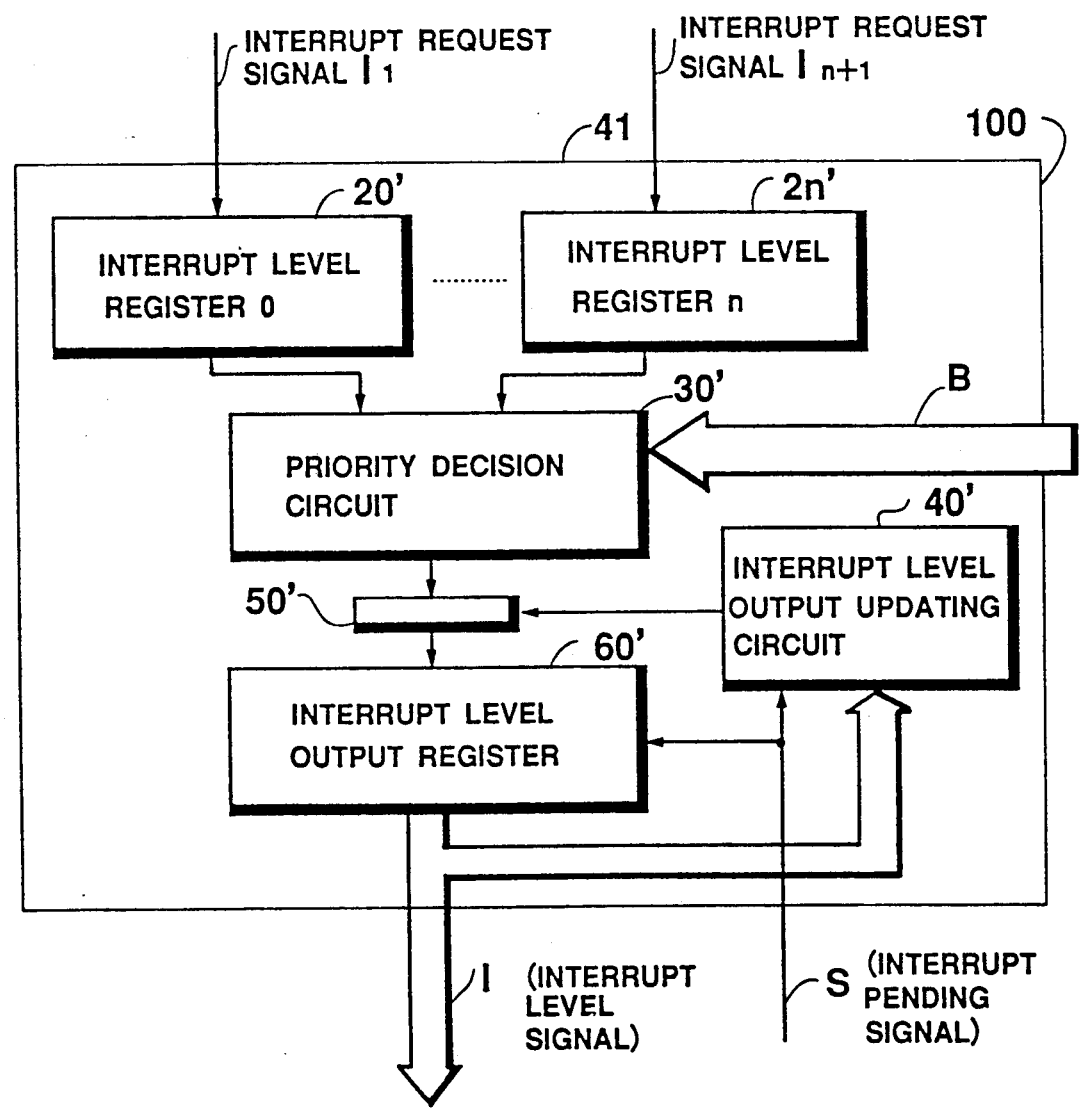
FIG. 6 is a schematic view showing a master interrupt controller shown in FIG. 5.

FIG. 6 is a view showing the details of the master interrupt controller $10_0$ shown in FIG. 5. The master controller $10_0$ comprises interrupt level registers $2_0'$ to $2_n'$, a priority decision circuit 30', an interrupt level output updating circuit 40', a gate 50', and an interrupt level output register 60'.

The arrangements of the interrupt controllers shown in FIGS. 6 and 3 are identical to each other except that the interrupt controller of FIG. 6 has the bus B through which bus interrupt request signals are transmitted from the respective slave interrupt controllers $10_1$ to $10_N$ to the priority decision circuit 30'. The bus B consists of the signals which indicate level of each interrupt request. The bus B can transmit the respective interrupt levels independently of each other.

With the priority decision circuit 30' of expanded function, the master interrupt controller $10_0$ selects one interrupt level of highest priority among the interrupt request signals $I_l$ to $I_{n-1}$ supplied to the interrupt level registers $2_0'$ to $2_n'$ and bus interrupt request signals from the slave interrupt controllers $10_1$ to $10_N$, and then the master interrupt controller $10_0$ outputs the selected one to the microprocessor 12.

FIG. 7 shows one of the slave controllers shown in FIG. 5.

The slave controller comprises interrupt level registers $2_0''$ to $2_n''$ to which respective interrupt request signals $I_l''$ to $I_{n\pm1}''$ are supplied, and an interrupt level decoder 80. Outputs of the registers $2_0''$ to $2_n''$ are connected to the decoder 80, and an output of the decoder 80 is connected to the bus B through which interrupt request signals are transmitted.

Therefore, the contents of the interrupt level registers $2_0''$ to $2_n''$ corresponding to the interrupt request signals $I_l''$ to $I_{n-1}''$ are inputted to the level decoder 80, and the decoder 80 outputs interrupt levels corresponding to the interrupt request signals to the master controller $10_0$ via the bus B.

As described above, according to the present invention, a microprocessor outputs an interrupt pending signal to an interrupt controller if an interrupt level signal given by the interrupt controller is not accepted by the microprocessor. With the use of the interrupt pending signal, the interrupt controller again outputs an interrupt level signal which is the highest priority at the time to the microprocessor. In this way, an interrupt request of higher priority that occurs during the not accepted period of the interrupt request of lower priority, can be processed in real time in the microprocessor.

Various modifications will become possible for those skilled in the art after receiving the teachings of the present disclosure without departing from the scope thereof.

What is claimed is:

1. An interrupt controller in a microprocessor system, for receiving a plurality of interrupt request signals from external devices and outputting an interrupt level signal to a microprocessor, comprising:
   a plurality of interrupt level registers for receiving said interrupt request signals and outputting a plurality of interrupt level register output signals that correspond to priorities of said interrupt request signals;
   a priority decision means for receiving said interrupt level register output signals and outputting a signal corresponding to one of said interrupt level register output signals with highest priority;
   an interrupt level output register for receiving output from said priority decision means and outputting to said microprocessor said interrupt level signal corresponding to output from said priority decision means, said interrupt level output register nullifying an interrupt level held in said interrupt level output register upon receipt of an interrupt pending signal from said microprocessor;
   an interrupt level output updating means for receiving said interrupt pending signal from said microprocessor and providing a control signal for updating said interrupt level output register with present output of priority decision means; and a gating means connected between said priority decision means and said interrupt level output register for receiving said control signal from said interrupt level output updating means and enabling updating of said interrupt level output register with present output from said priority decision means upon receipt of said control signal.

2. The interrupt controller as claimed in claim 1, wherein said priority decision circuit also receives interrupt level signals from slave interrupt controllers and outputs one interrupt level signal of highest priority selected among outputs of said interrupt level registers and of the slave interrupt controllers.

* * * * *